(12) United States Patent
Hutton et al.

(10) Patent No.: US 9,507,883 B2
(45) Date of Patent: Nov. 29, 2016

(54) METHOD AND APPARATUS FOR IMPLEMENTING A SYSTEM-LEVEL DESIGN TOOL FOR DESIGN PLANNING AND ARCHITECTURE EXPLORATION

(71) Applicant: Altera Corporation, San Jose, CA (US)

(72) Inventors: Michael David Hutton, Mountain View, CA (US); Herman Henry Schmit, Palo Alto, CA (US)

(73) Assignee: Altera Corporation, San Jose, CA (US)

( * ) Notice: Subject to any disclaimer, the term of this patent is extended or adjusted under 35 U.S.C. 154(b) by 559 days.

(21) Appl. No.: 13/925,764

(22) Filed: Jun. 24, 2013

(65) Prior Publication Data

US 2014/0379307 A1    Dec. 25, 2014

(51) Int. Cl.
*G06F 17/50* (2006.01)

(52) U.S. Cl.
CPC .......... *G06F 17/50* (2013.01); *G06F 17/5045* (2013.01); *G06F 17/5054* (2013.01)

(58) Field of Classification Search
CPC . G06F 17/50; G06F 17/5004; G06F 17/5045
USPC ........................................ 703/13, 14, 19, 20
See application file for complete search history.

(56) References Cited

U.S. PATENT DOCUMENTS

| | | | | |
|---|---|---|---|---|
| 6,269,467 B1* | 7/2001 | Chang | ................. | G06F 17/5022 716/104 |
| 2006/0129963 A1* | 6/2006 | Martin | ................ | G06F 17/5072 716/121 |
| 2007/0028196 A1* | 2/2007 | Martin | ................ | G06F 17/5045 716/102 |
| 2014/0143744 A1* | 5/2014 | Dimond | ............. | G06F 17/5054 716/105 |

OTHER PUBLICATIONS

Abdelli, et al., "High-Level Power Estimation of FPGA", Industrial Electronics, 2007. ISIE 2007. IEEE International Symposium on, IEEE, PI; Jun. 1, 2007; (Jun. 1, 2007), pp. 925-930; XP031156257, ISBN: 978-1-4244-0754-5.

So, et al., "Using estimates from behavioral synthesis tools in compiler-directed design space exploration"; Proceedings of the 40th Conference on Design Automation, DAC '03; Jan. 1, 2003 (Jan. 1, 2003); p. 514; XP055147877, New York, NY.

European Search Report dated Oct. 29, 2014 for European Application No. EP 14 17 2257.

* cited by examiner

*Primary Examiner* — Eunhee Kim
(74) *Attorney, Agent, or Firm* — L. Cho (57) ABSTRACT

A method for designing a system on a target device includes mapping a high-level description of the system onto a model of a target device prior to generating a register transfer level description of the system. A visual representation of the mapping is generated.

25 Claims, 11 Drawing Sheets

```
metadata: {owner: hschmit}
modulelist:
  a:
    portlist:
      x:
        dir: in
      y:
        dir: out
    rsrc: {le: 500, memk: 16}
  b:
    portlist:
      w: {dir: in}
      z: {dir: out}
    rsrc: {ddrio: 30, le: 700, memk: 100}
  c:
    netlist:
      A:
        conlist:
        - {link: L1, port: x}
        - {link: L2, port: y}
        mname: a
      B:
        conlist:
        - {link: L1, port: z}
        - {link: L2, port: w}
        drawnbox: [4, 2, 6, 3]
        mname: b
    portlist: []
topmodule: c
```

FIG. 9

METHOD AND APPARATUS FOR IMPLEMENTING A SYSTEM-LEVEL DESIGN TOOL FOR DESIGN PLANNING AND ARCHITECTURE EXPLORATION

FIELD

Embodiments of the present invention relate to tools for designing target devices and tools for designing systems on target devices. More specifically, embodiments of the present invention relate to a method and apparatus for implementing a system-level design tool for design planning and architecture exploration.

BACKGROUND

Target devices such as field programmable gate arrays (FPGAs), structured application specific integrated circuits (ASICs), and ASICs are used to implement large systems that may include million of gates and megabits of embedded memory. The complexity of a large system often requires the use of electronic design automation (EDA) tools to create and optimize a design for the system onto physical target devices. Among the procedures performed by EDA tools in a computer aided design (CAD) compilation flow are design generation, synthesis, placement, and routing of the system on the target device.

Modern high-end target device designs aim to support bandwidth-heavy applications. For example, current generation communications processing designs implemented on target devices support 10 Gb to 40 Gb throughput. Future designs will be targeting 100 Gb to 400 Gb and then Tb processing. Such applications are enabled by increasing speeds of transceiver (serial input output) blocks which are keeping pace with the input output bandwidth needs of applications.

As target device architects create next-generation designs to support these high-bandwidth applications, and as system designers attempt to implement their systems on these target devices, tools for architecture exploration and design planning will play an important role for creating target devices and systems that successfully meet timing requirements.

SUMMARY

A method and apparatus for implementing a system-level design tool for performing design planning and target device architecture exploration is disclosed. The system-level design tool allows for design planning and decision making prior to making key decisions that lock down algorithms and structures of a design. The system-level design tool may also be used to model designs for the purpose of more effectively architecting next-generation target devices.

Embodiments of the system-level design tool allow for wire-planning and resource management on a high-level design. Designs may be defined using a high-level description instead of a detailed hardware description such as register transfer level. The high-level description may be mapped to one or more target device architectures and the mapping may be output to a user such as a system designer or target device architect to evaluate.

BRIEF DESCRIPTION OF THE DRAWINGS

The features and advantages of embodiments of the present invention are illustrated by way of example and are not intended to limit the scope of the embodiments of the present invention to the particular embodiments shown.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, and programs are shown in block diagram form to avoid obscuring embodiments of the present invention unnecessarily.

Figure 1:
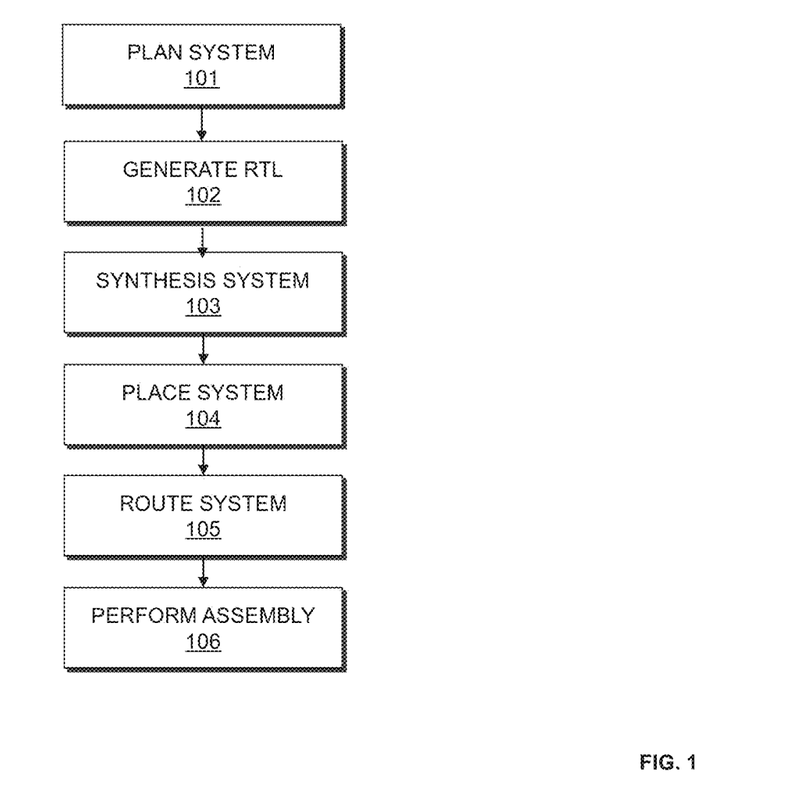
FIG. 1 is a flow chart illustrating a method for designing a system on a target device according to an exemplary embodiment of the present invention.

Embodiments of the present invention may be used to implement a system-level design tool that may be used for system design and architecture exploration. FIG. 1 illustrates an example where the system-level design tool is used in the context of system design. FIG. 1 is a flow chart illustrating a method for designing a system on a target device according to an exemplary embodiment of the present invention. The target device may be a field programmable gate array (FPGA), application specific integrated circuit (ASIC), a structured ASIC, or other device. According to one embodiment, the procedure illustrated in FIG. 1 may be performed by a computer aided design (CAD)/electronic design automation (EDA) tool implemented on a computer system.

At 101, planning is performed on a system to be implemented on a target device. During system planning, a high-level description of the system as implemented on the target device is tested, and metrics such as wire use, congestion, timing, resource allocation, latency, and/or other parameters are evaluated from the testing. According to an embodiment of the present invention, the high-level description of the system is at an abstract level prior to register timing level (RTL) generation. Mapping is performed and a description of the mapping is generated to allow a user to evaluate the system. Based on the evaluation of the mapping, the user may modify the system and/or modify the target device which the system is implemented on. Another mapping and evaluation may be performed in response to the changes made. System planning may be finalized after the user is satisfied with the evaluation of the system.

Target devices such as FPGAs and structured ASICs have a set of fixed resources with placements and functionality that are limited. Examples of resources that may be allocated specific locations and fixed functionalities include digital signal processing elements, memories, bus interfaces, processor cores, and memory controllers. Other resources, such as global and regional clocks may limit the placement of objects to locations that supply needed functionalities. In contrast, ASICs do not have pre-allocated resources. The planning performed for target devices such as FPGAs and structured ASICs takes into consideration the pre-placement constraints of objects, and the limitations imposed by the fixed locations for clocks and input outputs.

It should be appreciated that FPGAs are distinguished from structured ASICs in that they posses pre-constructed interconnect resources. Planning performed for target devices such as FPGAs requires the capability to model the specific capacity of different interconnect resources available and the demand on those interconnect resources imposed by a user's design.

At 102, an RTL description is generated for the system planned at 101. RTL is a design abstraction which models a synchronous digital circuit in terms of the flow of digital signals between hardware registers, and the logical operations performed on those signals. RTL abstraction is used in hardware description languages (HDLs) such as Verilog and VHDL to create RTL representations of a circuit, from which lower-level representations and wiring can be derived. According to an embodiment of the present invention, the RTL is used to represent the system to be implemented by the remainder of this process.

At 103, the system is synthesized. Synthesis includes generating a logic design of the system to be implemented by the target device. According to an embodiment of the present invention, synthesis generates an optimized logical representation of the system from the HDL design definition. Synthesis also includes mapping the optimized logic design. Mapping includes determining how to implement logic gates and logic elements in the optimized logic representation with specific resources on the target device. According to an embodiment of the present invention, a netlist is generated from mapping. This netlist may be an optimized technology-mapped netlist generated from the HDL.

At 104, the system is placed. According to an embodiment of the present invention, placement involves placing the mapped logical system design on the target device. Placement works on the technology-mapped netlist to produce a placement for each of the functional blocks. According to an embodiment of the present invention, placement includes fitting the system on the target device by determining which resources on the logic design are to be used for specific logic elements, and other function blocks determined to implement the system as determined during synthesis. Placement may include clustering which involves grouping logic elements together to form the logic clusters present on the target device.

At 105, the placed design is routed. During routing, routing resources on the target device are allocated to provide interconnections between logic gates, logic elements, and other components on the target device. Routability optimization may also be performed on the placed logic design. According to an embodiment of the present invention, the goal of routability optimization is to reduce the amount of wiring used to connect components in the placed logic design. Routability optimization may include performing fanout splitting, logic duplication, logical rewiring, or other procedures. It should be appreciated that one or more of the procedures may be performed on the placed logic design.

At 106, an assembly procedure is performed. The assembly procedure involves creating a data file that includes information determined by the procedures described at 101-105. The data file may be a bit stream that may be used to program a target device. According to an embodiment of the present invention, the procedures illustrated in FIG. 1 may be performed by an EDA tool executed on a first computer system. The data file generated may be transmitted to a second computer system to allow the design of the system to be further processed. Alternatively, the data file may be transmitted to a second computer system, which may be used to program the target device according to the system design. It should be appreciated that the design of the system may also be output in other forms such as on a display device or other medium. The target device may be programmed with the data file. By programming the target with the data file, components on the target device are physically transformed to implement the system.

Figure 2A:
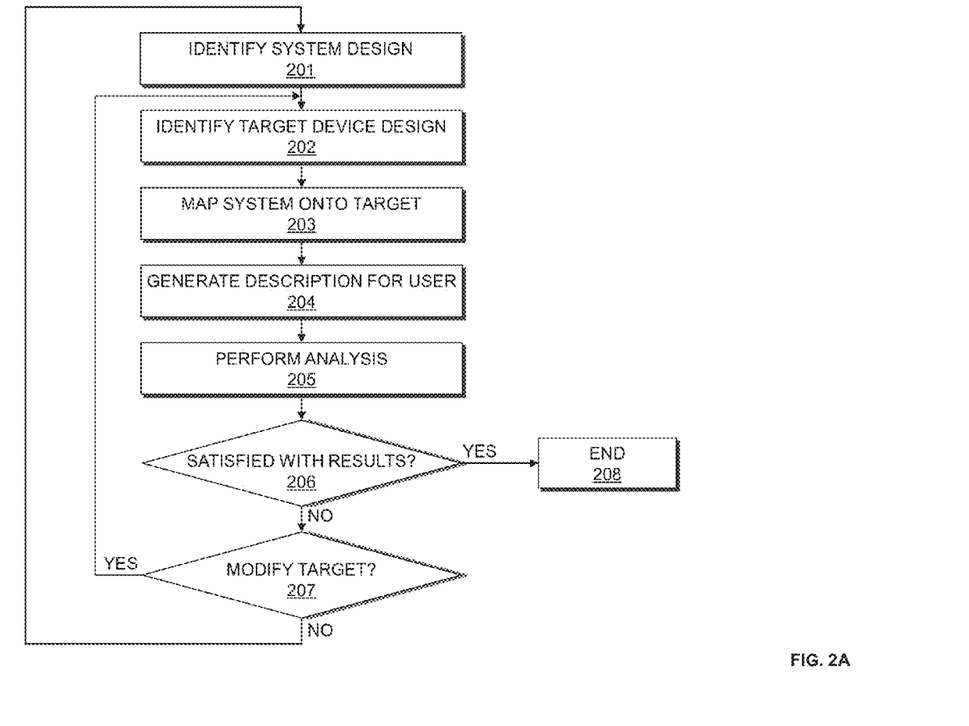
FIG. 2A is a flow chart illustrating a method for performing early planning according to an exemplary embodiment of the present invention.

FIG. 2A is a flow chart illustrating a method for performing system planning according to an exemplary embodiment of the present invention. The procedures illustrated in FIG. 2A may be used to implement procedure 101 shown in FIG. 1 in the context of designing a system. It should be appreciated, however, that the procedures illustrated in FIG. 2A may also be used independently for performing architecture exploration in the design of a target device.

At 201, a system design is identified. According to an embodiment of the present invention, the system design is identified from inputs received from a user. The system design may be a high-level description of the system that is not a complete RTL design. The high-level description of the system may describe components of the system as high-level blocks and include information regarding their resource usage such as the number of logic cells, registers, embedded memories, input outputs and other resources on the target device that they may use. The high-level description of the system may include a description of data path descriptions which include the width and speed requirements of data path between the high-level blocks. The high-level description of the system may include system-level meta-data that identify how data paths are used and whether they are mutually exclusive and can be shared. The system-level meta-data may also identify the latency tolerance of the data paths and whether a data path could be pipelined. The high-level description of the system may include block-level meta-data that identifies routing porosity which impacts the expected local use of a routing fabric of a component or high-level block. This allows the amount of routing resources available for global data paths to be assessed. According to an embodiment of the present invention, where the target device is an FPGA, the routing fabric may be organized according to different hierarchies such as global interconnect lines, local interconnect lines, and row and column interconnect lines. The interconnect lines may serve to route signals between components on the FPGA. It should be appreciated that among and within the hierarchies, the interconnect lines on the FPGA may have varying widths or capacity to support the transport of data.

The block-level meta-data may also include information regarding the maximum frequency of a block, the power consumption of the block, and a number of high-speed or low-power tiles used in previous implementations. The high-level description of the system may also provide SystemC or other description of the cycle-accurate/approximate behavior of a block that may be used in constructing dynamic simulation.

According to an embodiment of the present invention, the high-level description of the system may be entered by a user via a graphical user interface editor or a text editor. A machine-readable format may be produced by a tool or entered directly by the user. The high-level design description of the system captures the structure and data flow of the system including the high-level block description, data path descriptions, system-level meta-data, and block-level meta-data.

Figure 3A:
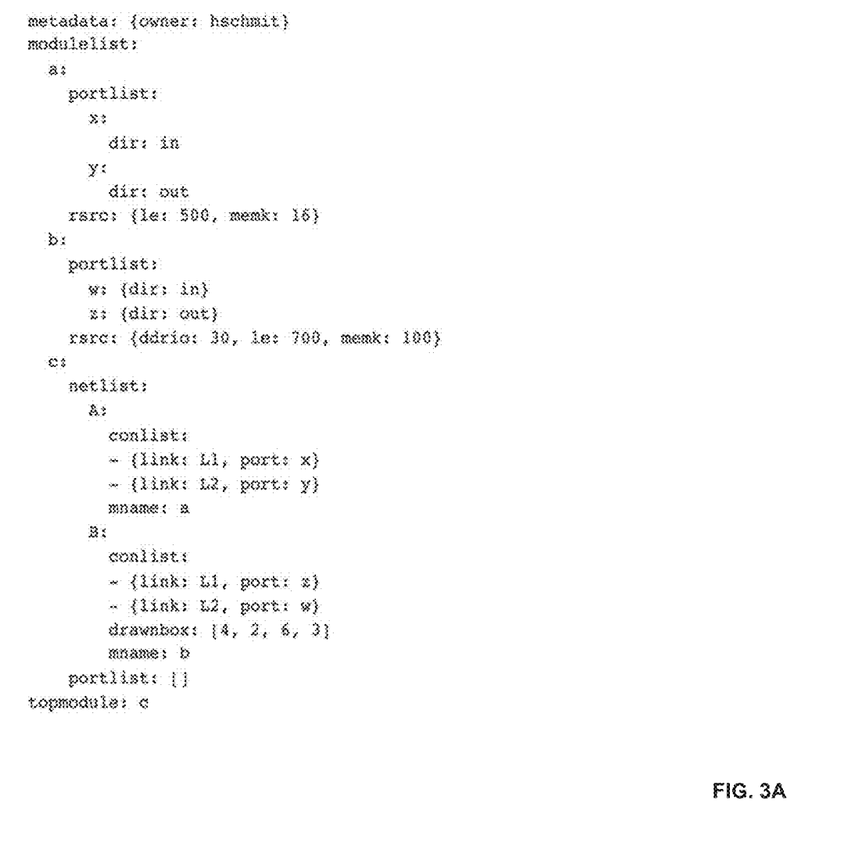
FIG. 3A illustrates an example of a high-level description of a system design implemented in block diagram language according to an embodiment of the present invention.

FIG. 3A illustrates an example of a high-level description of a system design implemented in block diagram language entered using a text editor according to an embodiment of the present invention. The format of the high-level description illustrated is YAML. The high-level description of the system design illustrated in FIG. 3A allows for the arbitrary expression of metadata while also providing formalism to express hierarchy and structural connectivity of the system. FIG. 3A includes a connection list which shows a number of links instantiated. The links includes a connection between port z of component B and port x of component A, and connection between port W of component B and port y of component A. The links represent connections between a source and a sink that may be implemented by routing resources on a target device.

Figure 3B:
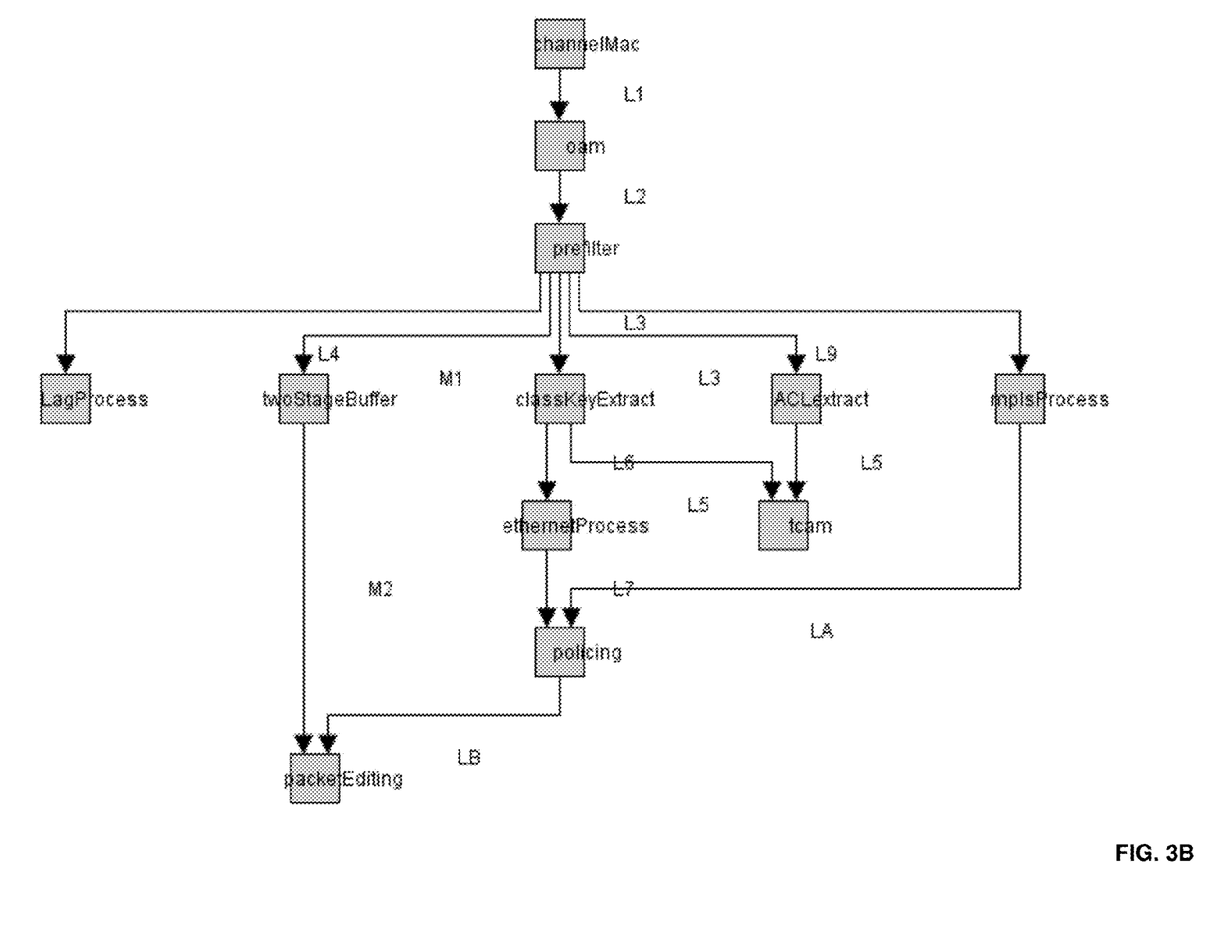
FIG. 3B illustrates an example of a high-level description of a system design implemented in block diagram form according to an embodiment of the present invention.

FIG. 3B illustrates an example of a high-level description of a system design implemented in block diagram form according to an embodiment of the present invention. The block diagram representation of the high-level description of the system design may be generated from the high-level description entered in text such as the one illustrated in FIG. 3A. Alternatively, a graphical user interface editor may be used to capture a high-level description of a system design in block diagram form input by a user to identify the high-level description of the system design and to generate a format of the high-level description as the one illustrated in FIG. 3A.

According to an embodiment of the present invention, an event-driven simulation kernel such as a SystemC template may be generated from the high-level description. The simulation kernel may be used for behavioral simulation to measure algorithmic changes to the design and for computing metrics such as memory and bus efficiency. In this embodiment, data paths may be converted into SystemC channels using the meta-data to identify register transfers and FIFO channels. Blocks may be converted into modules with appropriate port definitions to allow the user to enter behavioral descriptions of functionality. In addition to or alternatively to using the simulation kernel for simulations, the simulation kernel may be used to statistically model traffic load and latency. The models generated may be domain specific.

Referring back to FIG. 2A, at 202 a target device design is identified. According to an embodiment of the present invention, the target device design is identified from an architecture description input from a user. The architecture description may include a physical description describing instances of individual dice in the system including FPGA, memories, and interposers, and the interconnect between the dice and external interfaces. The architecture description may include a physical floor plan description of the target device that describes the locations of columns and rows of core and input output blocks. The architecture description may include a description of global routing resources such as a number or horizontal and vertical lines per row and column, the bandwidth in and out of hardened blocks such as memory blocks, and the physical delays of wires and blocks. The architecture description may include meta-data about target device resources such as the overhead delay required to pipeline a data path, push-out delays associated with widened data paths and congestion, and metrics of routability congestion. It should be appreciated that the architecture description may be of varying levels. For instance, the architecture description may include a very high level description of a target device. Alternatively, the architecture description may include a very low, detailed level description of the target device. For example, if the target device is an FPGA, a low level description of the target device may include a description of its underlying cells that include a lookup table and register. With the target device design identified from the architecture description, a model of the target device may be generated in which to implement the system design. According to an embodiment of the present invention, the model of the target device includes the details from the architecture description described above.

At 203, the system design is mapped onto the model of the target device. Mapping involves implementing the system design using the resources available on the target device. Mapping may be performed to account for fixed placement of hard objects on an FPGA or structured ASIC, clock use, IO connections, wire use, congestion, and timing of the system design on the target device. According to an embodiment of the present invention, latency planning may be performed during mapping to explore the usage of different data path widths for routing signals of a system.

Figure 4:
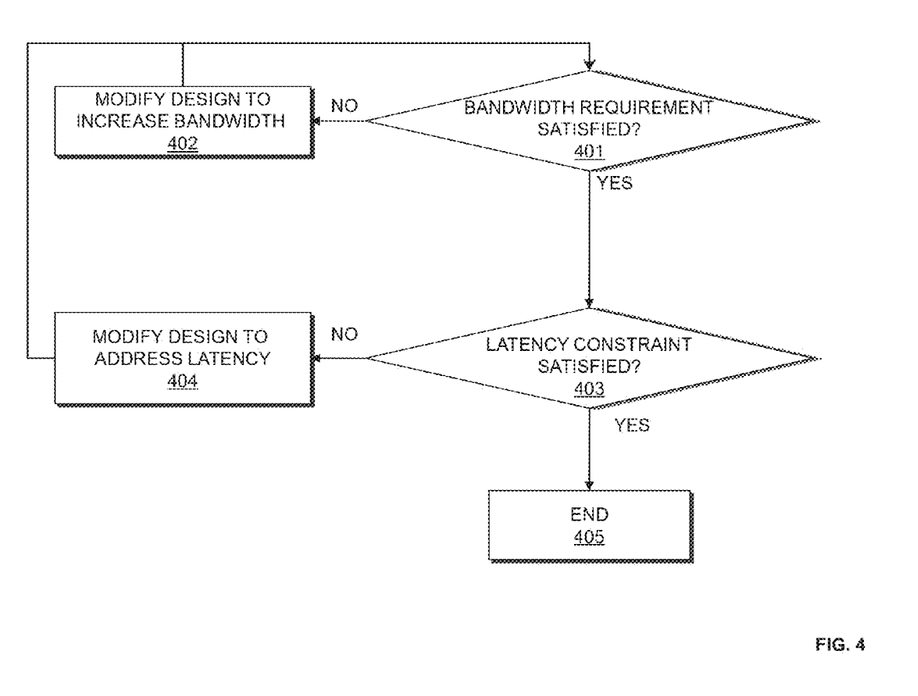
FIG. 4 is a flow chart illustrating a method for performing latency planning according to an exemplary embodiment of the present invention.

FIG. 4 is a flow chart illustrating a method for performing latency planning according to an exemplary embodiment of the present invention. The procedures illustrated in FIG. 4 may be performed at procedure 203 shown in FIG. 2A. At 401, it is determined whether selected routing resources on a target device allow data to be transmitted from a source to a destination with a bandwidth requirement associated with the design. According to an embodiment of the present invention, the bandwidth requirement may be associated with a set of links (routing resources) in the design. If the bandwidth requirement is satisfied, control proceeds to 403. If the bandwidth requirement has not been satisfied, control proceeds to 402.

At 402, the system design is modified to increase bandwidth. According to an embodiment of the present invention, different methods for providing the required bandwidth are investigated for the set of links with unsatisfied bandwidth requirements. The methods may include pipelining, which will increase the clock speed of the link, but will increase the latency of the link. The methods may also include widening, which will increase the number of wires going from the source to the destination or destinations of the link. Widening may also have a latency impact, and will also require more wiring resources, which could be a limited resource on a target device. After the modification is completed, control proceeds back to 401, where the bandwidth requirement is checked again.

At 403, it is determined whether a latency constraint is satisfied. According to an embodiment of the present invention, the implementation of the set of links is examined to determine whether it meets a latency constraint on the set of links. The latency constraint may be a simple constraint which is associated with a clock cycle or timing requirement. Alternatively, the latency constraint may be a complex constraint which is associated with a plurality of links. The examination and determination may be performed with a system level simulation during the system planning procedure. If the latency constraint is satisfied, control proceeds to 405. If it is not satisfied, control proceeds to 404.

At 404, the system design is modified to address latency. According to an embodiment of the present invention, different methods for modifying the set of links to adjust the latency are investigated and evaluated. For example, modifications to reduce latency may include reducing a distance traveled by a link, removing pipeline stages, narrowing a datapath, and/or using intrinsically faster interconnect resources. It should be appreciated that because these modifications may affect bandwidth as well as latency, the bandwidth requirement is verified after the modifications performed at 404. Control proceeds to 401.

At 405, control terminates the process.

Referring back to FIG. 2A, it should be appreciated that a plurality of target device models may be generated at 202 and unique mapping may be generated for each of the plurality of target device models at 203.

At 204, a description of the mapping is generated. The description of the mapping may be a visual representation of the mapping that illustrates a floor plan, a mapped view showing metrics for resource use, or other representation.

Figure 5:
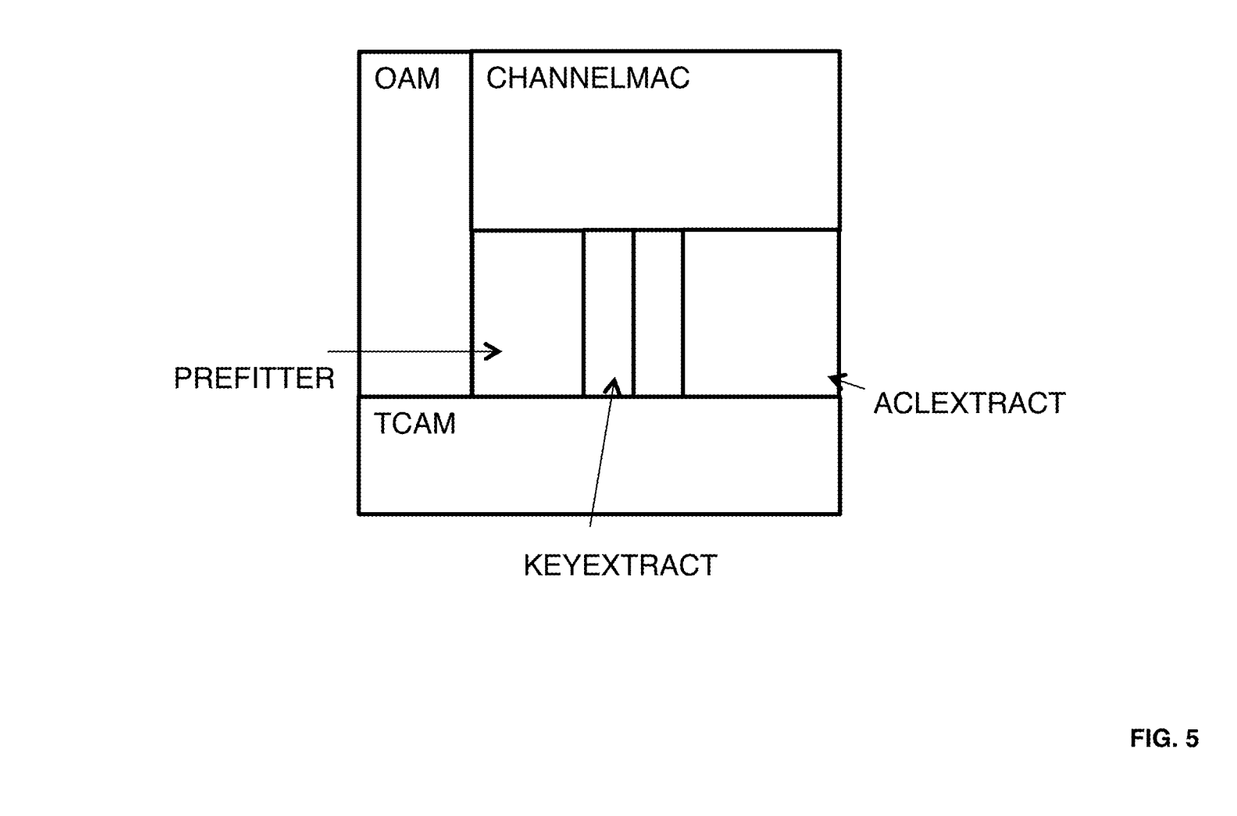
FIG. 5 illustrates an exemplary slicing floor plan according to an embodiment of the present invention.

FIG. 5 illustrates an exemplary slicing floor plan according to an embodiment of the present invention. After performing the mapping procedure described at 203. The block diagram of a system design, such as the one illustrated in FIG. 3B, is transformed into the slicing floor plan illustrated in FIG. 5. The slicing floor plan provides a visual representation of how certain blocks from the block diagram are to be positioned on a target device floor plan. According to an embodiment of the present invention, the meta-data associated with geographic resource availability on the target device may be used by the mapping procedure to re-size blocks to include the appropriate resources or indicate a mismatch between available resources in a physical region and those needed by the system design.

Figure 6:
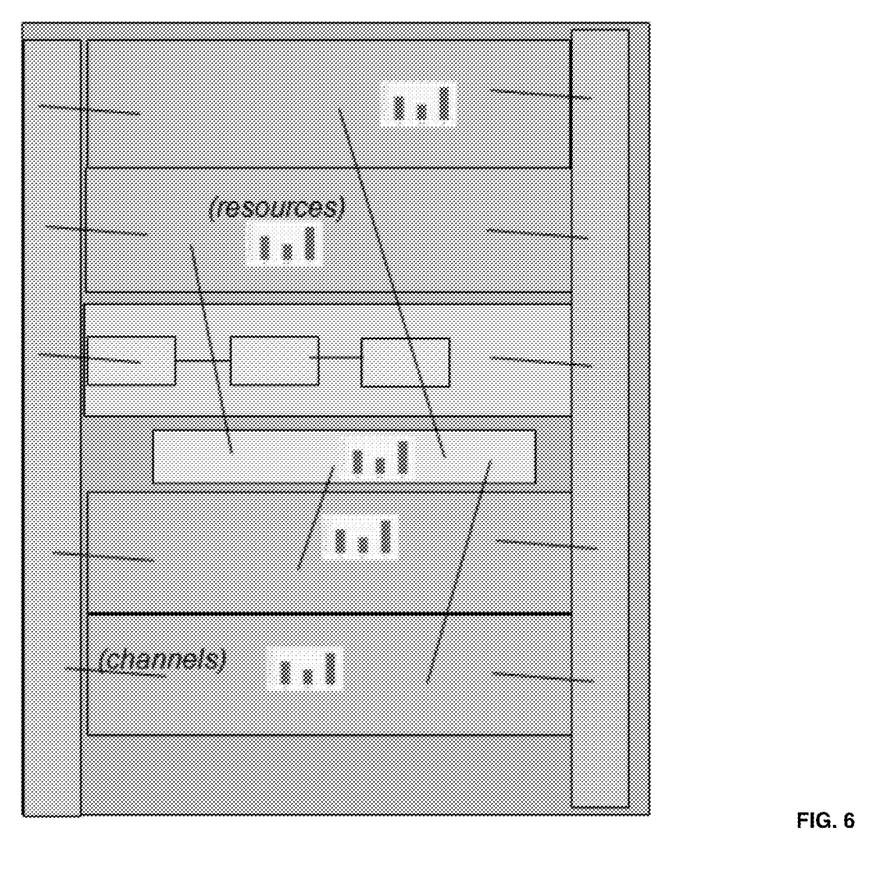
FIG. 6 illustrates an exemplary mapped view showing metrics for resource use according to an embodiment of the present invention.

FIG. 6 illustrates an exemplary alternative mapped view showing metrics for resource use according to an embodiment of the present invention. FIG. 6 illustrates another example of the results of the mapping procedure at 203. After performing the mapping procedure, a block diagram of a system design, such as the one showed in FIG. 3B, is transformed into the alternative mapped view. The alternative mapped view provides a visual representation of high-level data paths as they interconnect certain blocks from the block diagram. The alternative mapped view may also display information indicating the width and delay/speed of the high-level data path as well as the scarcity/abundance of the data path.

It should be appreciated that other visual representation of the results of the mapping procedure may be generated and provided to the user. For example, a resource allocation chart that illustrates use of device resources by module and free resources. In this embodiment, free resources that reside in another module's floor planned space may be distinguished from free resources that do not reside in another module's floor planned space. Another visual representation that may be generated may be a heat-map view that identifies areas on the floor plan where routing resources are most heavily used.

Referring back to FIG. 2A, at 205, analysis is performed on the system design and target device. According to an embodiment of the present invention, power analysis is performed using information associated with resource usage and capacitance in the target device architecture description to generate an estimated power consumption value. Activity rates and usability information derived from simulation may also be used to further improve the accuracy of the estimated power consumption value.

Some target device architecture may be provisioned with a global clock that is restricted. In these architectures logic must be mapped to regions of the device with common clocking regimes or data paths in one clock domain need to avoid regions in another clock domain. The analysis may identify any such clock planning and clock-resource violations.

At 206, it is determined whether the results of the mapping are satisfactory. If the results of the mapping are satisfactory, control proceeds to 208. If the results of the mapping are not satisfactory, control proceeds to 207.

At 207, it is determined whether modifications may be made to the target device architecture. According to an embodiment of the present invention, when the system-level design is used for architecture exploration, a target device architect may make modifications to the target device to improve the implementation of the system design on the target device. Modifications to the target device may include changing the positioning of the input output ring, positioning the location of memory interfaces, and increasing or decreasing the amounts or types of routing resources available on the target device. If modifications are to be made to the target device, control returns to 202 and the modifications are entered.

If modifications are not to be made to the target device, control returns to 201 to allow the user to modify the system design. According to an embodiment of the present invention, when the system-level design is used for design planning, a user may make modifications to the system design to improve the implementation of the system design on the target device. When modifications are not to be made to the target device, the same target device entered previously at 202 may be used again.

At 208, control terminates the process.

Embodiments of the present invention may be used as a system-level design tool that allows a user to obtain feedback regarding the mapping of a system design without requiring implementing the system design in RTL for place and route. Embodiments of the present invention allow for the planning of a system design by performing a floor planning which takes into account data path analysis, wire planning, and the sufficiency of resources. It should be appreciated that with reference to the process illustrated in FIG. 2A, several target devices may be identified at 202 and a single system design may be mapped onto a plurality of target device models at 203. This would allow a user to obtain a visual representation of how a single system design may be mapped onto different target device architectures and allow the user to select one of the system architectures to modify and eventually implement.

Figure 2B:
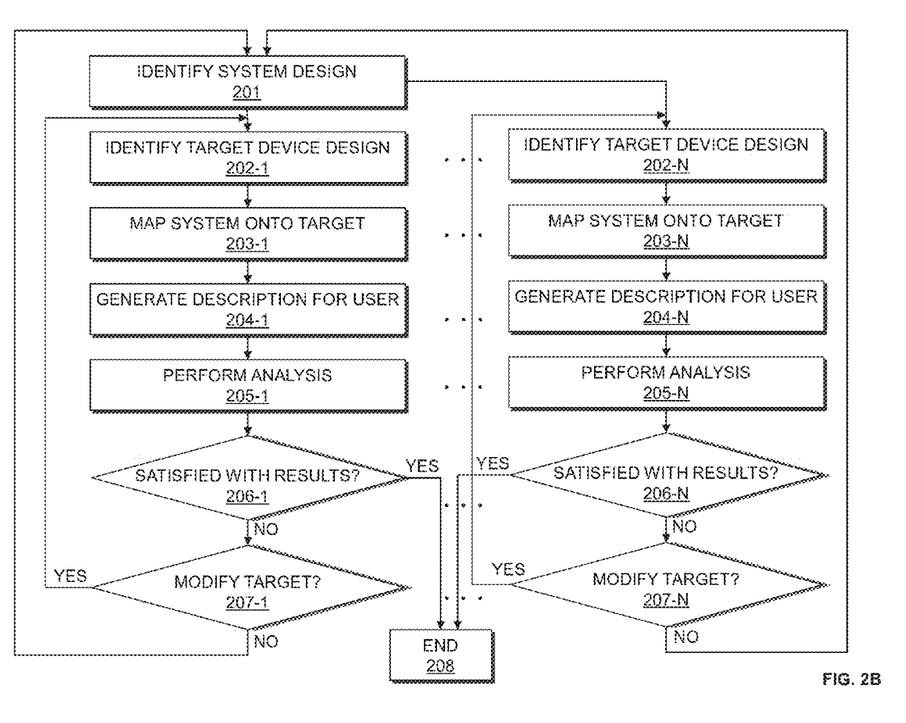
FIG. 2B is a flow chart illustrating a method for performing early planning with a plurality of target devices according to an exemplary embodiment of the present invention.

FIG. 2B is a flow chart illustrating a method for performing early planning with a plurality of target devices according to an exemplary embodiment of the present invention.

At 201, a system design is identified. According to an embodiment of the present invention, the system design is identified from inputs received from a user. The system design may be a high-level description of the system that is not a complete RTL design. The high-level description of the system may include similar characteristics as those described at 201 in FIG. 2A.

At 202-1 to 202-N, a target device design is identified, where N may represent any number of target devices. According to an embodiment of the present invention, the target device design is identified from an architecture description input from a user. The architecture description may include similar characteristics as those described at 202 in FIG. 2A. With the target device design identified from the architecture description, a model of the target device may be generated in which to implement the system design. According to an embodiment of the present invention, the model of the target device includes the details from the architecture description described above.

At 203-1 to 203-N, the system design is mapped onto each of the model of the target devices generated at 202-1 to 202-N respectively. The mapping procedure performed at 203-1 to 203-N may be similar to the mapping procedure described with reference to 203 in FIG. 2A.

At 204-1 to 204-N, a description of the mapping is generated for each of the mappings performed at 203-1 to 203-N respectively. The description of the mapping may be a visual representation of the mapping that illustrates a floor plan, a mapped view showing metrics for resource use, or other representation.

At 205-1 to 205-N, analysis is performed on the system design and each of the target devices generated at 203-1 to 203-N respectively. The analysis procedure performed at 205-1 to 205-N may be similar to the analysis procedure described with reference to 205 in FIG. 2A.

At 206-1 to 206-N, it is determined whether the results of the respective mappings are satisfactory. If the results of the mapping onto a target device is satisfactory, control proceeds to one of 208-1 to 208-N corresponding to the target device. If the results of the mapping are not satisfactory, control proceeds to one of 207-1 to 207-N.

At 207-1 to 207-N, it is determined whether modifications may be made to the respective target device architecture. According to an embodiment of the present invention, when the system-level design is used for architecture exploration, a target device architect may make modifications to the target device to improve the implementation of the system design on the target device. Modifications to the target device may include changing the positioning of the input output ring, positioning the location of memory interfaces, and increasing or decreasing the amounts or types of routing resources available on the target device. If modifications are to be made to the target device, control returns to 202 and the modifications are entered.

If modifications are not to be made to the target device, control returns to 201 to allow the user to modify the system design. According to an embodiment of the present invention, when the system-level design is used for design planning, a user may make modifications to the system design to improve the implementation of the system design on the target device. When modifications are not to be made to the target device, the same target device entered previously at 202-1 to 202-N may be used again.

At 208, further analysis may be performed to determine which of the target device designs offer the best solution for the system design.

Embodiments of the present invention may be used as an architecture exploration tool that allows a user to test various system designs on a target device architecture and to determine what modifications to the target device may improve the implementation of the various system designs. Solutions that may be sought in modifications made by the user include whether to implement memory blocks in columns or alternative arrangements, the amount of wiring to provide a routing fabric of the target device, and the types of interconnect to provide on the target device. It should be appreciated that with reference to the process illustrated in FIG. 2A, a plurality of system designs may be identified at 201 and mapped onto a single target device models at 203. This would allow a user to obtain a visual representation of how a particular target device architecture is capable of implementing a plurality of different system designs, and allow the user to see how modifications to a particular target device architecture impacts the plurality of system designs.

FIGS. 1, 2A-2B, and 4 are flow charts that illustrate embodiments of the present invention. Some of the techniques illustrated may be performed sequentially, in parallel or in an order other than that which is described and that the procedures described may be repeated. It should be appreciated that not all of the techniques described are required to be performed, that additional techniques may be added, and that some of the illustrated techniques may be substituted with other techniques.

Figure 7:
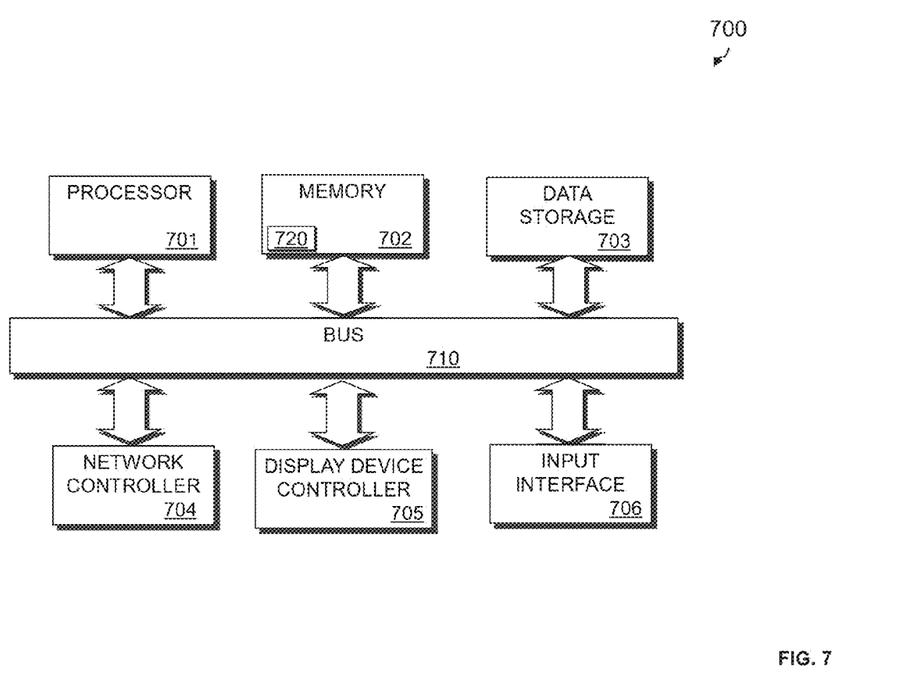
FIG. 7 illustrates a block diagram of a computer system implementing a system designer according to an embodiment of the present invention.

FIG. 7 is a block diagram of an exemplary computer system 700 in which an example embodiment of the present invention resides. The computer system 700 may be used to implement a system designer such as an EDA tool. The computer system 700 includes a processor 701 that processes data signals. The processor 701 is coupled to a bus 710 that transmits data signals between components in the computer system 700. The bus 710 may be a single bus or a combination of multiple buses. The computer system 700 includes a memory 702. The memory 702 may be a dynamic random access memory device, a static random access memory device, and/or other memory device. The memory 702 may store instructions and code represented by data signals that may be executed by the processor 701. A data storage device 703 is coupled to the bus 710. The data storage device 703 may be a hard disk drive, a floppy disk drive, a CD-ROM device, a flash memory device or other mass storage device.

A network controller 704 is coupled to the bus 710. The network controller 704 may link the computer system 700 to a network of computers (not shown) and supports communication among the machines. A display device controller 705 is coupled to the bus 710. The display device controller 705 allows coupling of a display device (not shown) to the computer system 700 and acts as an interface between the display device and the computer system 700. An input interface 706 is coupled to the bus 710. The input interface 706 may be, for example, a keyboard and/or mouse controller or other input interface. The input interface 706 allows coupling of an input device to the computer system 700 and transmits data signals from an input device to the computer system 700. It should be appreciated that computer systems having a different architecture or having different components may also be used to implement the computer system 700.

According to an embodiment of the present invention, a system designer 720 may reside in memory 702 and be executed by the processor 701. The system designer 720 may operate as a system-level design tool for performing design planning and target device architecture exploration. The design tool allows for design planning and decision making prior to making key decisions that lock down algorithms and structures of a design. The design tool may also be used to model designs for the purpose of more effectively architecting next-generation target devices. The design tool may be used for wire-planning and resource management on a high-level design. Designs may be defined using a high-level description instead of a detailed hardware description such as RTL. The high-level description may be mapped to one or more target device architectures and the mapping may be output to a user such as a system designer or target device architect to evaluate. The system designer 720 may also operate to synthesize, map, place and route the system onto a target device.

Figure 8:
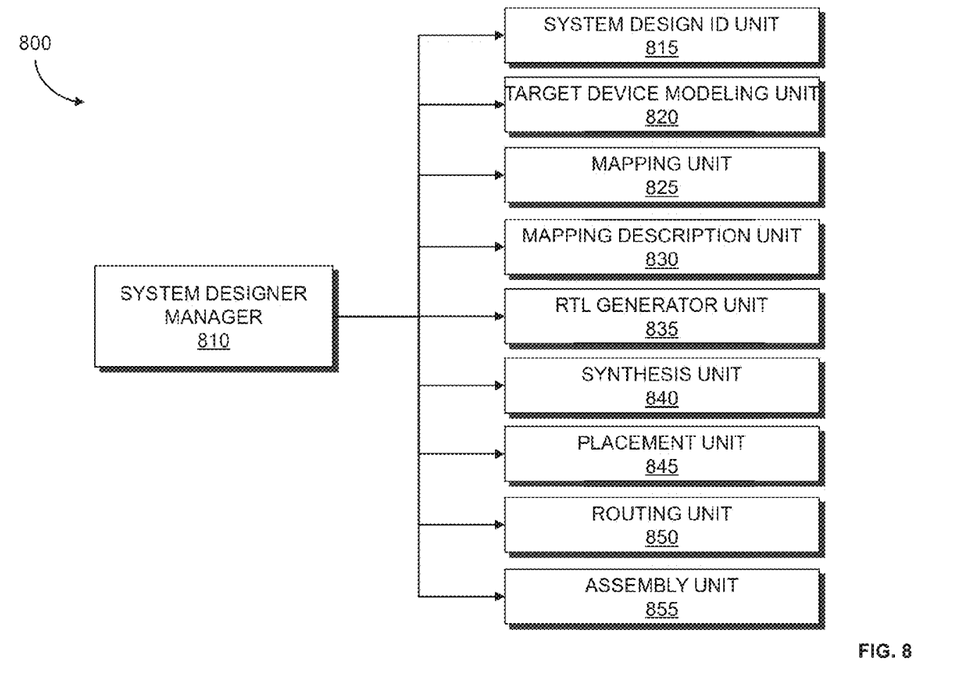
FIG. 8 illustrates a block diagram of a system designer according to an embodiment of the present invention.

FIG. 8 illustrates a system designer 800 according to an embodiment of the present invention. The system designer 800 may be an EDA tool for designing a system on a target device such as an FPGA, structured application-specific integrated circuit (ASIC), ASIC, or other circuitry. FIG. 8 illustrates modules implementing an embodiment of the system designer 800. According to one embodiment, the modules represent software modules and system design may be performed by a computer system such as the one illustrated in FIG. 7 executing sequences of instructions represented by the modules shown in FIG. 8. Execution of the sequences of instructions causes the computer system to support system design as will be described hereafter. In alternate embodiments, hard-wire circuitry may be used in place of or in combination with software instructions to implement embodiments of present invention. Thus, embodiments of present invention are not limited to any specific combination of hardware circuitry and software.

The system designer 800 includes a system designer manager 810. The designer system manager 810 is connected to and transmits data between the other components of the system designer 800. The system designer manager 810 provides a user interface that allows a user to input data into the system designer 800. According to an embodiment of the present invention, a description of a system may be input into the system designer by the user. The description of the system may be a high-level description generated by a user.

The system designer 800 includes a system design identification (ID) unit 815. The system design unit 815 identifies a system from inputs received from a user. The system design may be a high-level description of the system that is not a complete RTL design. The high-level description of the system may describe components of the system as high-level blocks and include information regarding their resource usage, data path descriptions which include the width and speed requirements of data path between the high-level blocks, system-level meta-data, and block-level meta-data. The high-level description of the system may also provide SystemC or other description of the cycle-accurate/approximate behavior of a block that may be used in constructing dynamic simulation.

The system designer 800 includes a target device modeling unit 820. The target device modeling unit 820 identifies a target device from an architecture description input from the user. The architecture description may include a physical description, a floor plan description, a description of global routing resources, and/or meta-data about target device resources. With the target device identified from the architecture description, a model of the target device may be generated in which to implement the system design.

The system designer 800 includes a mapping unit 825 that maps the system design onto the model of the target device. Mapping involves implementing the system design using the resources available on the target device. Mapping may be performed to account for wire use, congestion, and timing of the system design on the target device. According to an embodiment of the present invention, latency planning, as described with reference to FIG. 5, may be performed during mapping to explore the usage of different data path widths for routing signals of a system. The latency planning may be performed by a latency planning unit in the mapping unit 825.

The system designer 800 includes a mapping description unit 830. The mapping description unit 830 generates a description of the mapping performed by the mapping unit 825. The description of the mapping may be a visual representation of the mapping that illustrates a floor plan, a mapped view showing metrics for resource use, or other representation. Based upon an evaluation of the mapping, a user may modify the system design and/or the target device and perform another mapping to further evaluate the system design and/or target device architecture.

The system designer 800 includes a RTL generator unit 835. The RTL generator unit 835 generates an RTL description of the system design identified and evaluated. According to an embodiment of the present invention, the RTL is used to generate a hardware description language (HDL) design definition to describe the system. The HDL describes the operation of the system to be programmed on the target device. The HDL description provides high-level representations of a circuit in terms of the flow of signals (or transfer of data) between hardware registers, and the logic operations performed on those signals.

The system designer 800 includes a synthesis unit 840 that performs synthesis. The synthesis unit 840 generates a logic design of a system to be implemented on the target device. According to an embodiment of the system designer 800, the synthesis unit 840 takes a conceptual HDL design definition and generates an optimized logical representation of the system. The optimized logical representation of the system generated by the synthesis unit 840 may include a representation that has a reduced number of functional blocks and registers, such as logic gates and logic elements, required for the system. Alternatively, the optimized logical representation of the system generated by the synthesis unit 840 may include a representation that has a reduced depth of logic and that generates a lower signal propagation delay.

The synthesis unit 840 also performs technology mapping. Technology mapping involves determining how to implement the functional blocks and registers in the optimized logic representation utilizing specific resources such as cells on a target device thus creating an optimized "technology-mapped" netlist. The technology-mapped netlist illustrates how the resources (cells) on the target device are utilized to implement the system. In an embodiment where the target device is an FPGA, the technology-mapped netlist may include cells such as logic array blocks (LABs), registers, memory blocks, digital signal processing (DSP) blocks, input output (IO) elements or other components.

The system designer 800 includes a placement unit 845 that processes the optimized technology-mapped netlist to produce a placement for each of the functional blocks. The placement identifies which components or areas on the target device are to be used for specific functional blocks and registers.

The system designer 800 includes a routing unit 850 that performs routing. The routing unit 850 determines the routing resources on the target device to use to provide interconnection between the components implementing functional blocks and registers of the logic design.

The system designer 800 includes an assembly unit 855 that performs an assembly procedure that creates a data file that includes the design of the system generated by the system designer 800. The data file may be a bit stream that may be used to program the target device. The assembly unit 855 may output the data file so that the data file may be stored or alternatively transmitted to a separate machine used to program the target device. It should be appreciated that the assembly unit 855 may also output the design of the system in other forms such as on a display device or other medium.

It should be appreciated that embodiments of the present invention may be provided as a computer program product, or software, that may include a computer-readable or machine-readable medium having instructions. The instructions on the computer-readable or machine-readable medium may be used to program a computer system or other electronic device. The machine-readable medium may include, but is not limited to, floppy diskettes, optical disks, CD-ROMs, and magneto-optical disks or other type of media/machine-readable medium suitable for storing electronic instructions. The techniques described herein are not limited to any particular software configuration. They may find applicability in any computing or processing environment. The terms "computer-readable medium" or "machine-readable medium" used herein shall include any medium that is capable of storing or encoding a sequence of instructions for execution by the computer and that cause the computer to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Figure 9:
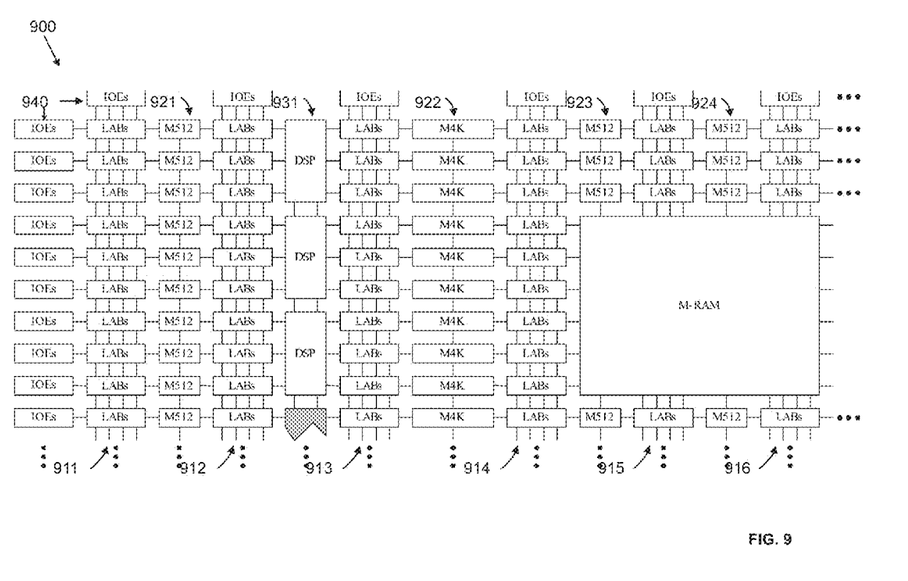
FIG. 9 illustrates an exemplary target device according to an embodiment of the present invention.

FIG. 9 illustrates a device 900 that may be used to implement a target device according to an embodiment of the present invention. The device 900 is a field programmable gate array (FPGA) that includes a plurality of logic-array blocks (LABs). Each LAB may be formed from a plurality of logic blocks, carry chains, LAB control signals, look up table (LUT) chain, and register chain connection lines. A logic block is a small unit of logic providing efficient implementation of user logic functions. A logic block includes one or more combinational cells, where each combinational cell has a single output, and registers. According to one embodiment of the present invention, the logic block may operate similarly to a logic element (LE), such as those found in the Stratix or Cyclone devices manufactured by Altera® Corporation, or a combinational logic block (CLB) such as those found in Virtex devices manufactured by Xilinx Inc. In this embodiment, the logic block may include a four input LUT with a configurable register. According to an alternate embodiment of the present invention, the logic block may operate similarly to an adaptive logic module (ALM), such as those found in Stratix devices manufactured by Altera Corporation. LABs are grouped into rows and columns across the device 900. Columns of LABs are shown as 911-916. It should be appreciated that the logic block may include additional or alternate components.

The device 900 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the device in between selected LABs or located individually or in pairs within the device 900. Columns of memory blocks are shown as 921-924.

The device 900 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the device 900 and are shown as 931.

The device 900 includes a plurality of input/output elements (IOEs) 940. Each IOE feeds an IO pin (not shown) on the device 900. The IOEs 940 are located at the end of LAB rows and columns around the periphery of the device 900. Each IOE may include a bidirectional IO buffer and a plurality of registers for registering input, output, and output-enable signals.

The device 900 may include routing resources such as LAB local interconnect lines, row interconnect lines ("H-type wires"), and column interconnect lines ("V-type wires") (not shown) to route signals between components on the target device.

In the foregoing specification, embodiments of the invention have been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A method for designing a system on a target device:
mapping a high-level description of the system onto a model of a target device prior to generating a register transfer level description of the system; and
generating a visual representation of the mapping.

2. The method of claim 1, wherein the mapping of the high-level description accounts for wire use of the system and wire resources on the target device.

3. The method of claim 1, wherein the mapping of the high-level description accounts for timing requirements of the system and routing congestion.

4. The method of claim 1, wherein the high-level description comprises identities of components in the system and resource usage of the components.

5. The method of claim 1, wherein the high-level description comprises width and speed requirement of data paths between components in the system.

6. The method of claim 1, wherein the high-level description comprises system-level meta-data describing latency tolerances of data paths between components in the system and uses of the data paths.

7. The method of claim 1, wherein the high-level description comprises block-level meta-data describing a component's routing porosity and maximum frequency.

8. The method of claim 1, further comprising mapping modifications to the high-level of the description onto the target device.

9. The method of claim 1, further comprising:
mapping the high-level of the description of the system onto a different model of the target device prior to generating the RTL of the system; and
generating a visual representation of the mapping onto the different model of the target to the user.

10. The method of claim 1, further comprising performing latency planning.

11. A non-transitory computer readable medium including a sequence of instructions stored thereon for causing a computer to execute a method comprising:
generating a plurality of models of a target device from a description input by a user;

mapping a high-level description of a system onto the models of the target device, wherein the high-level description of the system is at a level higher than a register transfer level description; and generating a visual representation of the mappings.

12. The non-transitory computer readable medium of claim 11, wherein the description input by the user comprises one or more physical floor plan descriptions of the target device.

13. The non-transitory computer readable medium of claim 11, wherein the description input by the user comprises a description of a range of global routing resources.

14. The non-transitory computer readable medium of claim 11, wherein the description input by the user comprises delay metrics associated with pipelining data paths and widening data paths.

15. The non-transitory computer readable medium of claim 11, wherein the description input by the user describes a range of wire-widths available on the target device.

16. The non-transitory computer readable medium of claim 11, wherein the high-level description of the system is at a level higher than a register transfer level description.

17. The non-transitory computer readable medium of claim 11, wherein the visual representation of the mapping comprises a slicing floor plan.

18. The non-transitory computer readable medium of claim 11, wherein the visual representation of the mapping comprises a mapped view illustrating resource use.

19. The non-transitory computer readable medium of claim 11, wherein the method further comprises:

modifying one of the models of the target device; and mapping the high-level description of the system onto the modified model.

20. The non-transitory computer readable medium of claim 11, wherein the method further comprises performing latency planning comprises by:

determining whether bandwidth requirements are satisfied; and modifying one of the plurality of models to increase bandwidth support in response to determining that the bandwidth requirements are not satisfied.

21. The non-transitory computer readable medium of claim 11, wherein the method further comprises performing latency planning comprises by:

determining whether a latency constraint is satisfied; and modifying one of the plurality of models in response to determining that the latency constraint is not satisfied.

22. A system designer, comprising:

a mapping unit that maps a high-level description of the system onto a model of a target device prior to generating a register transfer level description of the system; and a mapping description unit that generates a visual representation of the mapping, wherein at least one of the mapping unit and the mapping description unit is implemented by a processor.

23. The system designer of claim 22 further comprising a target device modeling unit that generates the model of the target device from a description input by a user.

24. The system designer of claim 22, wherein the mapping unit maps the high-level of the description of the system onto a different model of the target device.

25. The system designer of claim 22, wherein the mapping unit that maps modifications to the high-level of the description onto the model of the target device.

* * * * *